United States Patent Office 3,330,786
Patented July 11, 1967

3,330,786
POLYMERIC COMPOSITIONS
Arnold B. Finestone and Richard C. Westphal, Leominster, Mass., assignors to Foster Grant Co., Inc., a corporation of Delaware
No Drawing. Filed Mar. 5, 1963, Ser. No. 263,073
7 Claims. (Cl. 260—4)

This invention relates to a new process of producing impact polymeric materials having improved molding characteristics and to the products of said process. More particularly, this invention relates to an improved process for the production of alkenyl aromatic molding compositions having reduced viscosity and substantial improvement in flow properties during molding and to the products of said process.

It is generally recognized that thermoplastic resins, for example, alkenyl aromatic resins such as polystyrene and rubber modified polystyrene resins, do not ordinarily possess rapid flow characteristics at the high temperatures and pressures required in the molding of thin wall sections, particularly thin wall containers where accurate dimensions and adequate physical properties are critical. While it is known that the use of plasticizers increases the rate of flow of a polymer during molding, most plasticizers cause deterioration of other properties, for example, decreases in tensile strength and heat distortion temperature.

U.S. Patent No. 2,864,802 discloses compositions comprising mixtures of certain low molecular weight alkenyl aromatic resins and high molecular weight alkenyl aromatic resins possessing improved flow characteristics during molding. These compositions are prepared by addition of the low molecular weight polymer to the monomer, i.e., styrene, prior to polymerization or by blending of the low molecular weight polymer and the high molecular weight polymer.

While the techniques described in 2,864,802 to some extent do improve the molding characteristics of the resins in question, we have now found that the addition of a low molecular weight polymer prior to polymerization results in extremely slow polymerization rates while blending of the low molecular weight and high molecular weight polymers does not result in thorough dispersion. Moreover, we have noted that while there is little difference in melt index between the two methods of addition at low concentrations, i.e., at a 2% concentration of low molecular weight polymer, similar results are not obtained at high concentrations. At higher concentrations, definite improvement is noted when an initial addition of the low molecular weight component to the monomer is made prior to polymerization.

Unexpectedly, we now have found that if we add certain low molecular weight alkenyl aromatic polymers to the polymerization system during the preparation of high molecular weight high impact alkenyl aromatic polymers, we can prepare polymers having tremendous increases in melt index of the order of 50% to 400%, depending upon the percent of low molecular weight polymer added and upon the point of its addition without significant reduction in impact strength.

More particularly, we have now found that we can obtain a marked improvement in melt index in products prepared in a two step process in which a rubber is dissolved in a hydrocarbon monomer, i.e., styrene, and the mixture partially polymerized to form a pre-polymer followed by further polymerization of the pre-polymer to a higher state of conversion if a low molecular weight alkenyl aromatic polymer is added to the pre-polymer when a desired degree of pre-polymerization is reached prior to further polymerization.

In accordance with our invention, the addition of low molecular weight alkenyl aromatic polymers, i.e., a polystyrene having a molecular weight within the range of 5,000 to 40,000 viscosity average, to a partially polymerized resinous composition comprising a major proportion of an alkenyl aromatic monomer such as styrene and a minor proportion of a rubber of the type hereinafter defined, i.e., from 2 to 20 percent by weight of the monomer, prior to polymerization of the pre-polymer to the ultimate desired degree of conversion results in products of improved melt index, of the order described above, and consequently in higher flow rates during molding than obtained using other methods of additives.

Rubbers of the type generally used in preparing impact polymers may be employed. Thus any unsaturated and unvulcanized natural or synthetic rubber may be used in the process. Examples of suitable rubber or rubbery copolymers are natural crepe rubber, synthetic SBR type rubber containing from 40 to 98% by weight of butadiene and from 60 to 2 percent of styrene prepared by both hot and cold emulsion polymerization, synthetic GR–N type rubber containing from 65 to 82 percent by weight of butadiene and from 35 to 18 percent of acrylonitrile, SBR polybutadiene rubber and synthetic rubbers prepared from butadiene, butadiene-styrene, isoprene, etc., in methods employing heterogeneous catalyst systems, i.e., a trialkyl aluminum and a titanium halide.

Examples of alkenyl aromatic hydrocarbon monomers suitable in the preparation of the low molecular weight polymers employed herein as additives are styrene, vinyltoluene, vinylxylene, ethylvinylbenzene, isopropylstyrene, or ethylvinyltoluene, etc.

The low molecular weight polymers useful in this invention may be prepared in accordance with known procedures, such as by polymerization of the monomer in an inert organic solvent or in bulk, in which the molecular weight desired is obtained by the proper choice of the polymerization temperatures.

The quantity of low molecular weight polymer prepared as above to be added to the pre-polymer can be varied depending upon the properties desired in the ultimate product. In general, the low molecular weight polymers can be employed in amounts of from 0.5 to 15, preferably from 2 to 10 percent by weight of the final composition. Several additions employing the same concentrations can be used.

In the first step of our process, a natural or synthetic rubber is dissolved, with agitation, in an alkenyl monomer, for example styrene monomer. After dissolution of the rubber the usual additives with or without catalysts are added and the mixture polymerized with agitation until a desired solids content is obtained at which point the mixture is further polymerized in a bulk or a suspension system. The point of addition of the low molecular polymer to this pre-polymer is important and may be performed at various stages, i.e., at varying degrees of solids content, with optimum improvement in melt index being obtained by addition just prior to completion of polymerization. After addition of the low molecular weight polymer to the pre-polymer, the pre-polymer mixture is either mass polymerized further to the desired solids content or in a second step directly to a high molecular weight polymer composition by heating in bulk or dispersed in an aqueous medium at temperatures between about 80° C. and 235° C. at atmospheric or superatmospheric pressures. The temperature range so employed will vary in accordance with the polymerization system selected for the completion of polymerization.

The effect of the low molecular weight polymer may best be judged from the examples found below. In these examples, which are given by way of illustration only, a low molecular weight alkenyl aromatic polymer was added prior to initiation of polymerization, at various levels of solids conversion and just prior to initiation of the final polymerization conditions.

PRE-POLYMER

A mixture consisting of 262 parts of an SBR rubber containing 23.5% styrene and 76.5% butadiene was dissolved in 4458 parts styrene monomer. The mixture was heated to about 80° C. at which time 1.45 parts lauroyl peroxide and 1.45 parts of a known mercaptan molecular weight modifier dissolved in 55 parts styrene monomer were added and the mixture allowed to polymerize under agitation for about eight hours. The batch was cooled to about 75° C. and 3.0 parts of lauroyl peroxide dissolved in 94.0 parts of a white mineral oil plasticizer and 55 parts of styrene monomer were added. The mixture was allowed to react an additional ten hours at 80° C. until a solids content of about 30% was obtained, at which point the polymerization was stopped by cooling. This pre-polymer was used in the following examples as therein noted.

*Example 1*

To 900 parts of pre-polymer were added 180 parts of styrene monomer and the mixture placed in one quart metal cans in a heated bath for 17 hours at 100° C. and 9 hours at 150° C. The resulting polymer was crushed and extruded.

*Example 2*

A mixture of 18 parts of low molecular weight polystyrene, having a molecular weight of 21,000, and 18 parts of styrene monomer were added to 900 parts of pre-polymer. An additional 144 parts of styrene monomer were added to the mixture and the reaction completed as described in Example 1. The concentration of low molecular weight polystyrene was 2% by weight of the pre-polymer or 1.67% by weight of the total mixture.

*Example 3*

A mixture of 45 parts of low molecular polystyrene having a molecular weight of 21,000 and 45 parts of styrene monomer were added to 900 parts of pre-polymer. An additional 90 parts of styrene monomer were added and the reaction completed as described in Example 1. The concentration of low molecular weight polystyrene was 5% by weight of the pre-polymer or 4.17% by weight of the total mixture.

*Example 4*

A mixture of 90 parts of low molecular weight polystyrene having a molecular weight of 21,000 and 90 parts of styrene monomer were added to 900 parts of pre-polymer. The reaction was completed as described in Example 1. The concentration of low molecular weight polystyrene was 10% by weight of the pre-polymer or 8.34% by weight of the total mixture.

The physical properties of the products of Examples 1 to 4 are as follows:

| Example | 1 | 2 | 3 | 4 |
| --- | --- | --- | --- | --- |
| Percent low molecular weight polystyrene (based on pre-polymer) | 0 | 2 | 5 | 10 |
| Viscosity (8%) in toluene | 23.7 | 19.9 | 15.6 | 12.3 |
| Volatility (percent loss at 1 hr. at 140° C.) | 1.49 | 1.50 | 1.42 | 1.38 |
| Melt Index (grams per 10 minutes at 450° F.) | 1.45 | 2.50 | 4.46 | 7.70 |
| Izod Impact Notched (ft.-lbs.) | 1.26 | 1.16 | 1.04 | 0.92 |

The foregoing clearly shows an improvement in viscosity and melt index for the polymers of Examples 2, 3 and 4 over that of Example 1 with the significant improvement occurring with high concentrations of the low molecular weight polystyrene. Moreover, addition during the polymerization rather than at the start results in substantial viscosity improvement, as comparison of Example 2 reveals.

In Examples 5 to 8, the conditions of Examples 1 to 4 were employed with the exception that the low molecular weight polystyrene was added following polymerization to completion by extruding into the resin instead of during the polymerization. The physical properties of the resins produced follow:

| Example | 5 | 6 | 7 | 8 |
| --- | --- | --- | --- | --- |
| Percent low molecular wt. polystyrene | 0 | 2 | 5 | 10 |
| Viscosity | 25 | 21.8 | 20.5 | 16.3 |
| Melt Index | 1.43 | 2.38 | 2.50 | 4.12 |
| Impact | 1.26 | 1.16 | 1.08 | 0.94 |

Comparison of the results of Examples 2 to 4 with 6 to 8 illustrates that substantially more low molecular polystyrene is required when blended to give the same melt index obtained when it is added during polymerization. Additionally, it will be noted that the impact strength of the blends is lower than that of the comparable viscosity resins of Examples 2 to 4.

In the following examples a low molecular weight polystyrene was added at various stages during pre-polymerization. In all these examples the rubber content was 5.75%.

*Example 9*

A pre-polymer was prepared as in Example 1 except 287.5 parts of rubber was dissolved in 4433 parts of styrene monomer. Pre-polymerization was conducted at 80° C. for eight hours and at 75° for an additional three hours. The reaction was cooled to stop polymerization and the pre-polymer was placed in closed containers and polymerization was completed, without addition of low molecular weight polystyrene, in a heated bath at 100° C. for 17 hours and at 150° C. for an additional 9 hours. The resulting polymer was crushed and extruded.

*Example 10*

Example 9 was repeated except 100 parts of a low molecular weight polystyrene having a molecular weight of 12,000 was added to the mixture prior to dissolving the rubber and the initial styrene monomer concentration was reduced to 4333 parts. The mixture was reacted at 80° C. for 8 hours and at 75° C. for an additional 9½ hours. The mixture was then transferred to closed containers and polymerization was completed as in Example 9.

*Example 11*

Example 9 was repeated except 250 parts of low molecular weight polystyrene having a molecular weight of 12,000 were added to the mixture prior to dissolving the rubber and the initial styrene monomer content was reduced to 4183 parts. The mixture was reacted at 80° C. for 8 hours and at 75° C. for an additional 16¼ hours. The mixture was transferred to closed containers and polymerization was completed as in Example 9.

*Example 12*

Example 10 was repeated except the low molecular weight polymer was added after 8 hours of pre-polymerization instead of initially. The mixture was reacted for an additional 6 hours at 75° C. then transferred to closed containers and polymerization completed as in Example 9.

*Example 13*

Example 11 was repeated except the low molecular weight polystyrene was added at 8 hours instead of initially. The mixture was reacted for an additional 12 hours at 75° C. then transferred to closed containers and reaction completed as in Example 9.

*Example 14*

Example 13 was repeated except the low molecular weight polystyrene was added approximately one hour before transferring to the closed containers to complete polymerization.

*Example 15*

Example 14 was repeated except 500 parts of the low molecular weight polystyrene were added about one hour before transferring to closed containers to complete polymerization and the initial monomer content was reduced to 3933 parts.

Physical properties of the polymers produced in Examples 9 to 15 were as follows:

| Percent low molecular weight polystyrene Initial addition: | 0 | 2 | 5 | 10 |
|---|---|---|---|---|
| Example No | 9 | 10 | 11 | |
| Viscosity | 23.6 | 22.7 | 18.0 | |
| Volatility | 0 | 0.21 | 0.30 | |
| Melt Index | 1.25 | 0.72 | 3.06 | |
| Impact | 1.92 | 1.76 | 1.74 | |

| Percent low molecular weight polystyrene 8 hour addition: | 0 | 2 | 5 | 10 |
|---|---|---|---|---|
| Example No | | 12 | 13 | |
| Viscosity | | 22.5 | 15.9 | |
| Volatility | | 0 | 0.22 | |
| Melt Index | | 1.63 | 3.38 | |
| Impact | | 1.98 | 1.44 | |

| Percent low molecular weight polystyrene Addition prior to transfer: | 0 | 2 | 5 | 10 |
|---|---|---|---|---|
| Example No | | | 14 | 15 |
| Viscosity | | | 15.5 | 11.5 |
| Volatility | | | 0.19 | 0.40 |
| Melt Index | | | 3.92 | 9.30 |
| Impact | | | 1.42 | 1.12 |

These results show slight improvements in properties as the time of addition of low molecular weight polystyrene approaches the end of the pre-polymer cycle. Later addition also eliminates the slower reaction rates obtained with earlier additions.

In the examples which follow, 16 through 19, respectively, the conditions of Examples 1 to 4 were employed except that the pre-polymer was prepared with a stereoregulated polybutadiene of about 95% cis content in place of the SBR rubber. The physical properties of the resins produced are as follows:

| Example | 16 | 17 | 18 | 19 |
|---|---|---|---|---|
| Percent low molecular weight polystyrene | 0 | 2 | 5 | 10 |
| Viscosity | 16.3 | 15.5 | 13.2 | 11.6 |
| Volatility | 1.78 | 1.72 | 1.61 | 1.79 |
| Melt Index | 3.08 | 3.25 | 5.26 | 7.59 |
| Impact | 1.74 | 1.34 | 1.38 | 1.14 |

In Examples 20 through 23, which follow, the conditions of Examples 1 to 4 were employed except that the pre-polymer was prepared with an emulsion prepared polybutadiene in place of the SBR rubber. Physical properties of the resins produced are as follows:

| Example | 20 | 21 | 22 | 23 |
|---|---|---|---|---|
| Percent low molecular weight polystyrene | 0 | 2 | 5 | 10 |
| Viscosity | 32.0 | 26.8 | 23.3 | 18.0 |
| Volatility | 1.52 | 1.49 | 1.50 | 1.46 |
| Melt Index | 1.23 | 1.33 | 1.80 | 2.25 |
| Impact | 1.96 | 1.84 | 1.60 | 1.20 |

Examples 24 through 27, which follow, also employed the conditions of Examples 1 to 4 except that the pre-polymer was prepared with a styrene stereoregulated butadiene copolymer containing 25% styrene and 75% butadiene in place of the SBR rubber. The physical properties of the resins produced are as follows:

| Example | 24 | 25 | 26 | 27 |
|---|---|---|---|---|
| Percent low molecular weight polystyrene | 0 | 2 | 5 | 10 |
| Viscosity | 24.8 | 21.1 | 16.0 | 12.5 |
| Volatility | 1.22 | 1.35 | 1.30 | 1.25 |
| Melt Index | 1.35 | 2.63 | 4.88 | 8.10 |
| Impact | 1.18 | 1.02 | .90 | .76 |

While the invention has been described with respect to certain embodiments, it is not so limited and it is to be understood that variations and modifications thereof which are obvious to those skilled in the art may be made without departing from the spirit or scope of this invention.

We claim:

1. A method of preparing impact polymers of improved melt index which comprises the steps of dissolving a rubber component selected from the group consisting of natural rubbers and synthetic rubbers derived from conjugated dienes in an alkenyl aromatic monomer, subjecting the resulting solution to polymerizing conditions until the polymerization mixture has a solids content of at least about 30% and before substantial completion of polymerization, adding a low molecular weight alkenyl aromatic polymer having an average molecular weight of from about 5,000 to 40,000 in an amount by weight of the finished polymer of from about 0.5 to about 15% to the partially polymerized rubber component and alkenyl aromatic monomer, and subjecting this mixture to polymerizing conditions to substantially complete polymerization.

2. A method according to claim 1 in which the alkenyl aromatic monomer is styrene.

3. A method according to claim 1 in which the alkenyl aromatic monomer is styrene and the low molecular weight alkenyl aromatic polymer is polystyrene.

4. A method according to claim 1 in which the alkenyl aromatic monomer is styrene, the low molecular weight alkenyl aromatic polymer is polystyrene, and the rubber component is a butadiene-styrene copolymer.

5. A method according to claim 1 in which the alkenyl aromatic monomer is styrene, the low molecular weight alkenyl aromatic polymer is polystyrene, and the rubber component is a stereoregulated butadiene-styrene copolymer.

6. A method according to claim 1 in which the alkenyl aromatic monomer is styrene, the low molecular weight alkenyl aromatic polymer is polystyrene, and the rubber component is a polybutadiene rubber.

7. A method according to claim 1 wherein the alkenyl aromatic monomer is styrene, the low molecular weight alkenyl aromatic polymer is polystyrene, and the rubber component is a stereoregulated polymer of butadiene.

References Cited

UNITED STATES PATENTS

| 2,863,849 | 12/1958 | Fordham | 260—876 |
| 2,913,426 | 11/1959 | Li et al. | 260—880 |
| 3,129,199 | 4/1964 | Lunk | 260—880 |

MURRAY TILLMAN, *Primary Examiner.*

D. J. BREZNER, *Assistant Examiner.*